United States Patent
Chuang et al.

(10) Patent No.: US 9,980,310 B2
(45) Date of Patent: May 22, 2018

(54) METHOD FOR PROCESSING UNSUCCESSFUL PDN ESTABLISHMENT REQUEST

(71) Applicant: MEDIATEK INC., Hsinchu (TW)

(72) Inventors: Po-Ying Chuang, Taipei (TW); Chi-Hsien Chen, Taipei (TW); Chien-Chun Huang-Fu, Hsinchu (TW)

(73) Assignee: MEDIATEK INC., HsinChu (TW)

( * ) Notice: Subject to any disclaimer, the term of this patent is extended or adjusted under 35 U.S.C. 154(b) by 9 days.

(21) Appl. No.: 14/884,896

(22) Filed: Oct. 16, 2015

(65) Prior Publication Data

US 2016/0113053 A1    Apr. 21, 2016

Related U.S. Application Data

(60) Provisional application No. 62/065,145, filed on Oct. 17, 2014.

(51) Int. Cl.
H04W 76/02    (2009.01)

(52) U.S. Cl.
CPC ................................. *H04W 76/027* (2013.01)

(58) Field of Classification Search
CPC .................................................. H04W 76/027
See application file for complete search history.

(56) References Cited

U.S. PATENT DOCUMENTS

| | | | |
|---|---|---|---|
| 2010/0279704 A1 | 11/2010 | Vachhani | 455/453 |
| 2012/0207129 A1* | 8/2012 | Sun | H04W 76/027 370/331 |
| 2013/0258998 A1* | 10/2013 | Ramachandran | H04W 76/027 370/331 |
| 2013/0286935 A1 | 10/2013 | Yerrabommanahalli et al. | 370/328 |
| 2013/0301547 A1* | 11/2013 | Gupta | H04W 76/048 370/329 |
| 2014/0105125 A1 | 4/2014 | Chaponniere et al. | 370/329 |

(Continued)

FOREIGN PATENT DOCUMENTS

| | | |
|---|---|---|
| CN | 103906082 A | 1/2008 |
| CN | 101924633 A | 6/2009 |

(Continued)

OTHER PUBLICATIONS

International Search Report and Written Opinion of International Search Authority for PCT/CN2015/092178 dated Jan. 20, 2016 (10 pages).

3GPP TSG-CT WG1 Meeting #86 C1-140280, Change Request, Huawei et al., Guangzhou, P.R. of China dated Jan. 20-24, 2014 (3 pages).

(Continued)

*Primary Examiner* — Clemence Han
(74) *Attorney, Agent, or Firm* — Imperium Patent Works; Zheng Jin; Helen Mao

(57) ABSTRACT

A method of enhanced session management procedure is proposed. A user equipment, upon receiving a rejected PDN connectivity request with a cause code, automatically alters the rejected factor to fit network restrictions based on the received cause code. The UE then retries the PDN connectivity procedure by sending a subsequent PDN connectivity request using the altered factor. By automatically altering the rejected factor and reattempting to establish an EPS bearer for data service without user interaction, possible permanent rejection can be avoided in case of user error or unawareness.

20 Claims, 5 Drawing Sheets

(56) References Cited

U.S. PATENT DOCUMENTS

| | | | |
|---|---|---|---|
| 2014/0204736 A1* | 7/2014 | Bakker | H04W 8/22 370/230 |
| 2014/0215081 A1* | 7/2014 | Cili | H04W 76/027 709/227 |
| 2014/0295824 A1* | 10/2014 | Madasamy | H04W 48/18 455/424 |
| 2015/0181639 A1* | 6/2015 | Liu | H04W 76/027 370/329 |
| 2015/0351136 A1 | 12/2015 | Kaura et al. | 370/329 |
| 2015/0358898 A1* | 12/2015 | Lair | H04W 48/12 455/434 |
| 2015/0373770 A1* | 12/2015 | Niemi | H04W 48/12 370/329 |
| 2016/0065486 A1 | 3/2016 | Hariharan et al. | 709/226 |
| 2016/0345243 A1* | 11/2016 | Zaus | H04W 48/14 |

FOREIGN PATENT DOCUMENTS

| | | |
|---|---|---|
| CN | 101969637 A | 7/2009 |
| CN | 102984815 A | 12/2012 |

OTHER PUBLICATIONS

3GPP TSG-CT WG1 Meeting #86 C1-140433, Change Request, Huawei et al., Guangzhou, P.R. of China dated Jan. 20-24, 2014 (3 pages).

International Search Report and Written Opinion of International Search Authority for PCT/CN2015/092179 dated Feb. 2, 2016 (13 pages).

USPTO, Office Action for related U.S. Appl. No. 14/884,913 dated Sep. 26. 2017 (15 pages).

\* cited by examiner

Upon receipt of the SM/ESM request message, the network may reject the request with a cause code, including:

- #8: operator determined barring;
- #26: insufficient resources;
- #27: missing or unknown APN;
- #28: unknown PDN type;
- #29: user authentication failed;
- #30: request rejected by Serving GW or PDN GW;
- #31: request rejected, unspecified;
- #32: service option not supported;
- #33: requested service option not subscribed;
- #34: service option temporarily out of order;
- #35: PTI already in use;
- #38: network failure;
- #50: PDN type IPv4 only allowed;
- #51: PDN type IPv6 only allowed;
- #53: ESM information not received;
- #54: PDN connection does not exist;
- #55: multiple PDN connections for a given APN not allowed;
- #65: maximum number of EPS bearers reached;
- #66: requested APN not supported in current RAT and PLMN combination;
- #95-111: protocol errors;
- #112: APN restriction value incompatible with active EPS bearer context.

FIG. 3

METHOD FOR PROCESSING UNSUCCESSFUL PDN ESTABLISHMENT REQUEST

CROSS REFERENCE TO RELATED APPLICATIONS

This application claims priority under 35 U.S.C. § 119 from U.S. Provisional Application No. 62/065,145 filed on Oct. 17, 2014, the subject matter of which is incorporated herein by reference.

TECHNICAL FIELD

The disclosed embodiments relate generally to wireless communication, and, more particularly, to method for processing unsuccessful PDN establishment request procedures.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). The $3^{rd}$ generation partner project (3GPP) network normally includes a hybrid of 2G/3G/4G systems. With the optimization of the network design, many improvements have developed over the evolution of various standards.

The main function of the Session Management (SM) for 2G/3G systems or Evolved Packet System (EPS) SM (ESM) for 4G systems is to support Packet Data Protocol (PDP) context or EPS bearer handling of the user terminal. Upon receipt of the SM/ESM request message, the network may reject the request with a cause code. For different cause codes, the network may provide a retry mechanism for the user to resend the SM/ESM request if certain conditions are satisfied. However, for some specific cause codes, the UE is not allowed to apply the retry mechanism and resend another SM/ESM request unless the UE is switched off or the USIM is removed. As a result, those cause codes create probably permanent rejection in providing data service to the user. A solution is sought.

SUMMARY

A method of enhanced session management procedure is proposed. A user equipment, upon receiving a rejected PDN connectivity request with a cause code, automatically alters the rejected factor to fit network restrictions based on the received cause code. The UE then retries the PDN connectivity procedure by sending a subsequent PDN connectivity request using the altered factor. For example, the cause codes may be "PDP type IPv4 only allowed", "PDP type IPv6 only allowed", and "requested APN not supported in current RAT and PLMN combination". Based on those cause codes, the altered factors may be a different PDP type, a different APN, or the same APN but for different RAT/PLMN combination. By automatically altering the rejected factor and reattempting to establish an EPS bearer for data service without user interaction, possible permanent rejection can be avoided in case of user error or unawareness.

In one embodiment, a user equipment (UE) transmits a packet data network (PDN) connectivity request in a mobile communication network. The PDN connectivity request is associated with a set of parameters including a requested access point name (APN), a PDN type, a radio access technology (RAT), and a PLMN/EPLMN ID. The UE receives a PDN connectivity reject message from the network. The PDN connectivity reject message comprises a cause code. The UE automatically updates the set of parameters based on the cause code. Finally, the UE transmits a subsequent PDN connectivity request to the network using the updated set of parameters. In one example, the cause code indicates only PDN type IPv4 is allowed, only PDN type IPv6 is allowed, or the requested APN is not supported in the current RAT/PLMN combination.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 3 illustrates an exemplary list of cause codes associated with an unsuccessful SM/ESM procedure initiated by a UE.

DETAILED DESCRIPTION

Reference will now be made in detail to some embodiments of the invention, examples of which are illustrated in the accompanying drawings.

Figure 1:
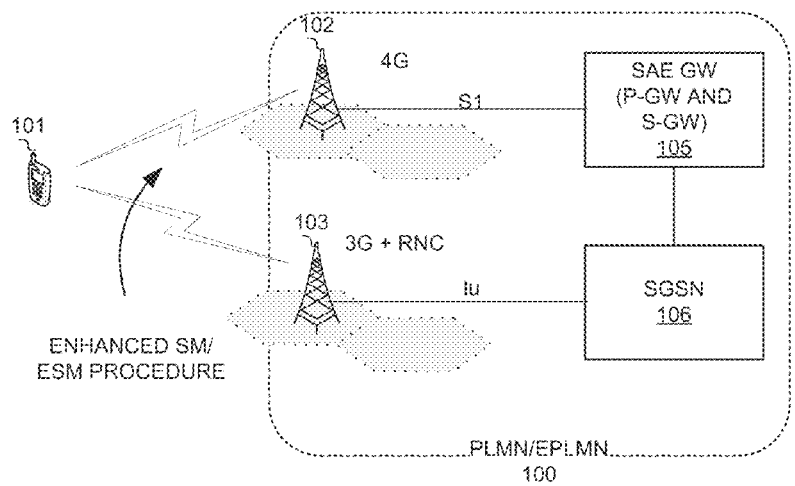
FIG. 1 illustrates an exemplary 3GPP wireless network with an enhanced session management procedure in accordance with one novel aspect.

FIG. 1 illustrates an exemplary 3GPP system 100 with an enhanced session management procedure in accordance with one novel aspect. 3GPP system 100 is a Public Land Mobile Network (PLMN) or an Equivalent Public Land Mobile Network (EPLMN) that supports one or more wireless radio network access (RAT) networks, such a 4G/LTE system, a 3G system, and possibly a 2G system (not shown). Each of the 3GPP system has a fixed base infrastructure unit, such as wireless communications stations 102 and 103, forming wireless networks distributed over a geographical region. The base unit may also be referred to as an access point, an access terminal, a base station, a NodeB, an eNodeB, or by other terminology used in the art. Each of the wireless communications stations 102 and 103 serves a geographic area. A 4G/LTE system has a evolved node-B (eNodeB) 102 connecting with a system architecture evolution (SAE) gateway 105, which includes the serving gateway (S-GW) and the packet data network (PDN) gateway (P-GW) via the S1 interface. A 3G system has a node-B 103 and a radio network controller (RNC). The RNC of the 3G system connects with a serving GPRS support node (SGSN) 106, which is connected to SAE gateway 105.

A wireless communications device/user equipment (UE) 101 in 3GPP wireless network 100 can be served by eNodeB 102 or by node-B 103. UE 101 establishes a bearer with 3GPP system 100 for data services. UE 101 establishes EPS bearer in the 4G system via the S1 interface, or establishes a PDP context in the 3G system via the Iu interface. Session Management (SM) procedures for 3G/2G systems or Evolved Packet System (EPS) SM (ESM) procedures for 4G systems are applied by UE 101 to support Packet Data Protocol (PDP) context or EPS bearer handling of the user terminal. For example, SM procedures include PDP context activation procedure, secondary PDP context activation procedure, PDP context modification or deactivation procedure, and MBMS corresponding procedures. Similarly, ESM procedures include PDN connectivity or disconnect procedures and Bearer resource allocation or modification procedures.

In the example of FIG. 1, to establish an EPS bearer in the 4G system, UE 101 sends a PDN connectivity request to eNodeB 102. Upon receipt of the PDN connectivity request message, the network may reject the request with a cause code. For different cause codes, the network may provide a retry mechanism for UE 101 to resend the request if certain conditions are satisfied. However, for some specific cause codes, UE 101 is not allowed to apply the retry mechanism and resend another request unless UE 101 is switched off or the USIM is removed. As a result, those cause codes create probably permanent rejection in providing data service to the user.

In one novel aspect, UE 101 automatically alters the rejected factor to fit network restrictions based on the received cause code. UE 101 then retries the PDN connectivity procedure by sending a subsequent PDN connectivity request to eNodeB 102 using the altered factor. For example, the cause codes may be "PDP type IPv4 only allowed", "PDP type IPv6 only allowed", and "requested APN not supported in current RAT and PLMN combination". Based on those cause codes, the altered factors may be a different PDP type, a different APN, or the same APN but for different RAT/PLMN combination. By automatically altering the rejected factors and reattempting to establish EPS bearer for data service without user interaction, possible permanent rejection can be avoided in case of user typo or unawareness.

Figure 2:
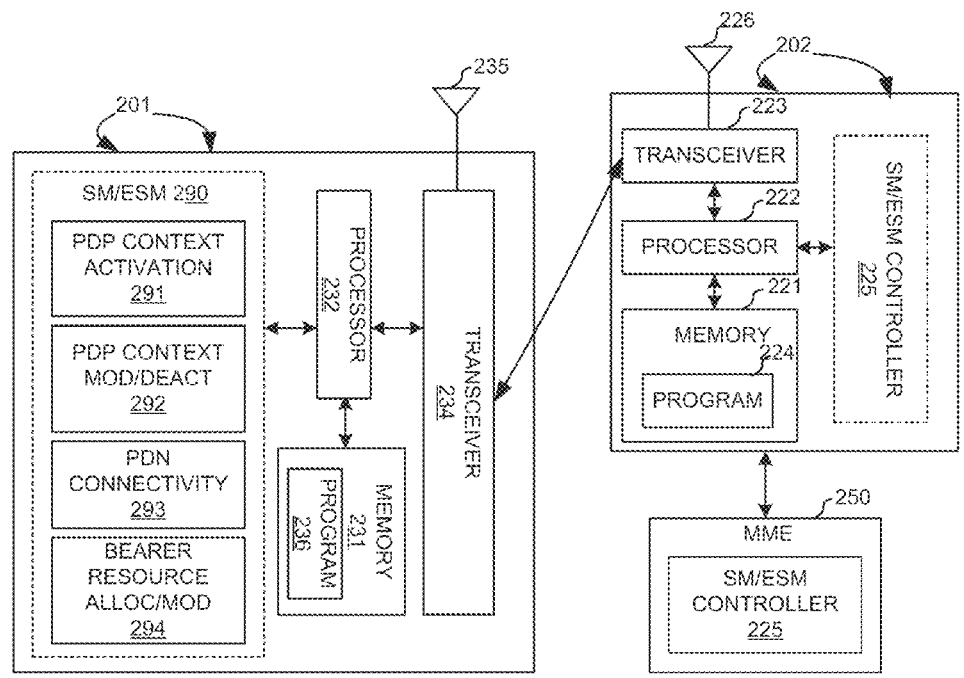
FIG. 2 illustrates simplified block diagrams of a user equipment and a base station in accordance with embodiments of the current invention.

FIG. 2 illustrates simplified block diagrams of a user equipment UE 201 and a base station BS 202 in accordance with embodiments of the current invention. BS 202 has an antenna 226, which transmits and receives radio signals. A RF transceiver module 223, coupled with the antenna, receives RF signals from antenna 226, converts them to baseband signals and sends them to processor 222. RF transceiver 223 also converts received baseband signals from processor 222, converts them to RF signals, and sends out to antenna 226. Processor 222 processes the received baseband signals and invokes different functional modules to perform features in base station 202. Memory 221 stores program instructions and data 224 to control the operations of base station 202. Base station 202 also includes a set of control circuits, such as a SM/ESM controller 225 that carry out functional tasks for enhanced session management features in the 3GPP network. In an alternative embodiment, the SM/ESM controller is located in a mobility management entity (MME) 250 within the evolved packet core (EPC), which performs the enhanced session management features in the 3GPP network.

Similarly, UE 201 has an antenna 235, which transmits and receives radio signals. A RF transceiver module 234, coupled with the antenna, receives RF signals from antenna 235, converts them to baseband signals and sends them to processor 232. RF transceiver 234 also converts received baseband signals from processor 232, converts them to RF signals, and sends out to antenna 235. Processor 232 processes the received baseband signals and invokes different functional modules to perform features in the mobile station 201. Memory 231 stores program instructions and data 236 to control the operations of the mobile station 201.

UE 201 also includes a set of control circuits that carry out functional tasks. An SM/ESM controller 290 supports PDP context and EPS bearer handling in the 3GPP system. For example, the SM/ESM controller further comprises a PDP context activation handler 291 for activating PDP context in 3G systems, a PDP context modification and/or deactivation handler 292 for 3G systems, a PDN connectivity handler 293 for establishing PDN connection in 4G systems, and an EPS bearer resource allocation/modification handler 294 for 4G systems. The PDN connectivity handler 293 may further comprise an error cause code handler for handling various cause codes upon unsuccessful PDN connectivity procedure. In one embodiment, the error cause code handler alters the rejected factor to fit network restrictions based on the cause code. UE 201 then retries the PDN connectivity procedure by sending a subsequent PDN connectivity request to BS 202 using the altered factor.

FIG. 3 illustrates an exemplary list of cause codes associated with an unsuccessful SM/ESM procedure initiated by a UE. To initiate an SM/ESM procedure, the UE sends an SM/ESM request to the network. The network may reject the request with a cause code. As depicted by table 300 of FIG. 3, the list of cause code includes:
- #8: operator determined barring;
- #26: insufficient resources;
- #27: missing or unknown APN;
- #28: unknown PDN type;
- #29: user authentication failed;
- #30: request rejected by Serving GW or PDN GW;
- #31: request rejected, unspecified;
- #32: service option not supported;
- #33: requested service option not subscribed;
- #34: service option temporarily out of order;
- #35: PTI already in use;
- #38: network failure;
- #50: PDN type IPv4 only allowed;
- #51: PDN type IPv6 only allowed;
- #53: ESM information not received;
- #54: PDN connection does not exist;
- #55: multiple PDN connections for a given APN not allowed;
- #65: maximum number of EPS bearers reached;
- #66: requested APN not supported in current RAT and PLMN combination;
- #95-111: protocol errors;
- #112: APN restriction value incompatible with active EPS bearer context.

Figure 4:
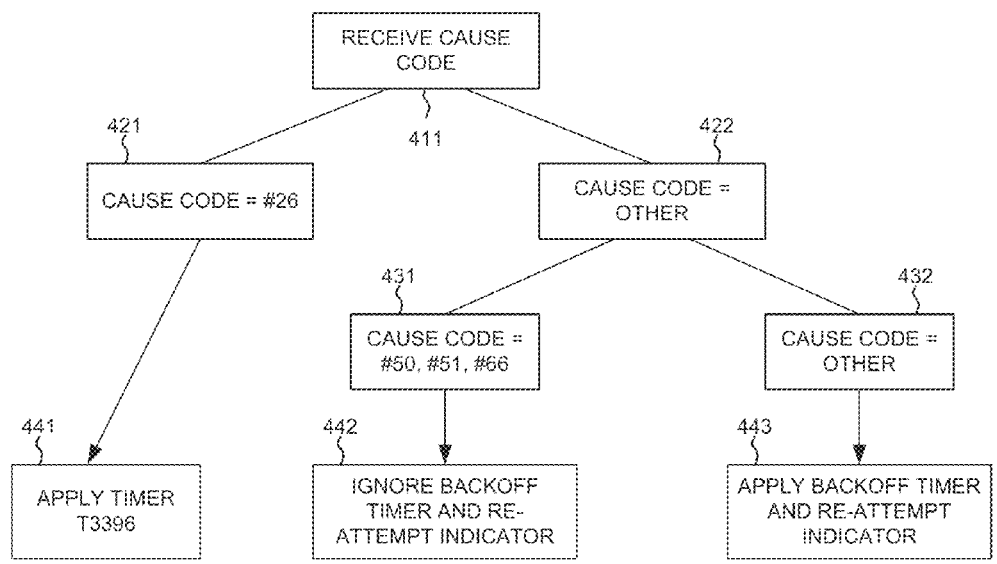
FIG. 4 illustrates exemplary SM/ESM retry procedures associated with an unsuccessful SM/ESM procedure with various cause codes.

FIG. 4 illustrates exemplary SM/ESM retry procedures associated with an unsuccessful SM/ESM procedure with various cause codes. Note that some of the following examples are for 4G scenario; however, 2/3G scenario is also applicable. For unsuccessful SM/ESM procedure, various retry mechanisms are supported by the network for different cause codes. In the example of FIG. 4, in step 411, a UE receives an SM/ESM reject message with a cause code. The UE then checks the cause code. In step 421, the cause code is #26 "insufficient resources". For cause code #26, an SM/ESM timer T3396 is introduced for APN based congestion control. When the SM/ESM request is rejected by the network with cause code #26, the network may trigger the session management timer T3396. The value of this timer can be provided by the network to the UE. In step 441, the UE applies timer T3396 and can retry the SM/ESM procedure upon T3396 timer expiry.

In step 422, the UE determines that the cause code is not #26. In step 432, the UE further determines that the cause code is not #50, #51, nor #66. In general, the network may include a back-off timer value in a session management reject message to regulate the time interval at which the UE may retry the same procedure. The Back-off timer is applied when cause code is other than #26 "insufficient resources", for example, when cause codes are #8/#27/#32/#33. The back-off timer has a default value of 12 min. In addition, for SM/ESM cause codes other than #26 "insufficient resources", the network may include a re-attempt indicator to indicate whether the UE is allowed to re-attempt the corresponding SM/ESM procedure for the same APN after RAT change. Both back-off timer value and re-attempt indicator can be retrieved from the network within the reject message concurrently. For example, in step 443, the UE applies the back-off timer and the re-attempt indicator. The UE can start the back-off timer in one RAT (e.g., LTE) while sending/retrying the SM request for the same APN in another RAT (e.g., 3G) if the re-attempt indicator is "yes".

After triggering the PDN connectivity procedure (for normal or emergency purpose), UE may get response with the following cause codes which may affect the SM efficiency and downgrade user experience. These cause codes include #50 "PDP type IPv4 only allowed", #51 "PDP type IPv6 only allowed, and #66 "requested APN not supported in current RAT and PLMN combination". Cause code #50 is used by the network to indicate that only PDN type IPv4 is allowed for the requested PDN connectivity. Cause code #51 is used by the network to indicate that only PDN type IPv6 is allowed for the requested PDN connectivity. Cause code #66 is used by the network to indicate that the procedure requested by the UE was rejected, as the requested APN is not supported in the current RAT and PLMN.

Upon detecting these special cause code (step 431), the UE will follow specific restrictions provided by the network (step 442). For example, if the ESM cause code is #50 "PDN type IPv4 only allowed" or #51 "PDN type IPv6 only allowed", the UE shall ignore the Back-off timer value IE and Re-attempt indicator IE provided by the network, if any. The UE shall not automatically send another PDN CONNECTIVITY REQUEST message for the same APN that was sent by the UE using the same PDN type until the UE is registered to a new PLMN, the PDN type which is used to access to the APN is changed, the UE is switched off, or the USIM card is removed. If the ESM cause code is #66 "requested APN not supported in current RAT and PLMN combination", the UE shall ignore the Re-attempt indicator IE provided by the network, if any. If the Back-off timer value IE is not included, the UE shall not send another PDN CONNECTIVITY REQUEST message for the same APN in the current PLMN in S1 mode until the UE is switched off or the USIM is removed. From the above illustration, it can be seen that if a user tries to access data service but provides the wrong PDN type or APN (e.g., typo), and if the user is unaware of such error, then the user will be rejected from the data service permanently unless the user manually switches off the UE or remove the USIM card. This results in undesirable user experience. Note that the above examples are for 4G scenario; however, 2/3G scenario is also applicable.

Figure 5:
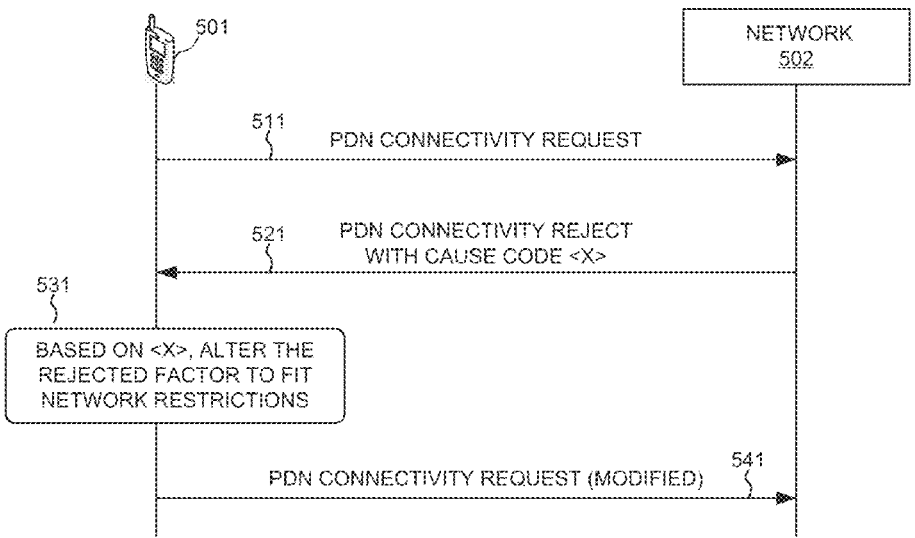
FIG. 5 illustrates a solution for handling PDN connectivity reject with certain cause codes.

FIG. 5 illustrates a solution for handling PDN connectivity rejection with certain permanent cause codes. In step 511, UE 501 sends a PDN connectivity request to network 502. In step 521, the network sends a PDN connectivity reject message back to UE 501. The reject message comprises a cause code <X>. The cause code indicates why the PDN connectivity is rejected, and/or which parameters/factors are rejected. In step 531, the UE alters the rejected factor to fit network restrictions based on the cause code. For example, if the rejected factor is PDN type, then the UE changes the PDN type to a different type. If the rejected factor is APN, then the UE changes the APN to a different name. In step 541, the UE sends another PDN connectivity request to the network. The PDN connectivity request contains modified PDN parameters or factors such that the UE does not violate the network restrictions and is able to retry to establish an EPS bearer for data service. By automatically altering the rejected parameters or factors without user interaction, the user will not be permanently rejected for data service under cause codes #50/#51/#66.

Figure 6:
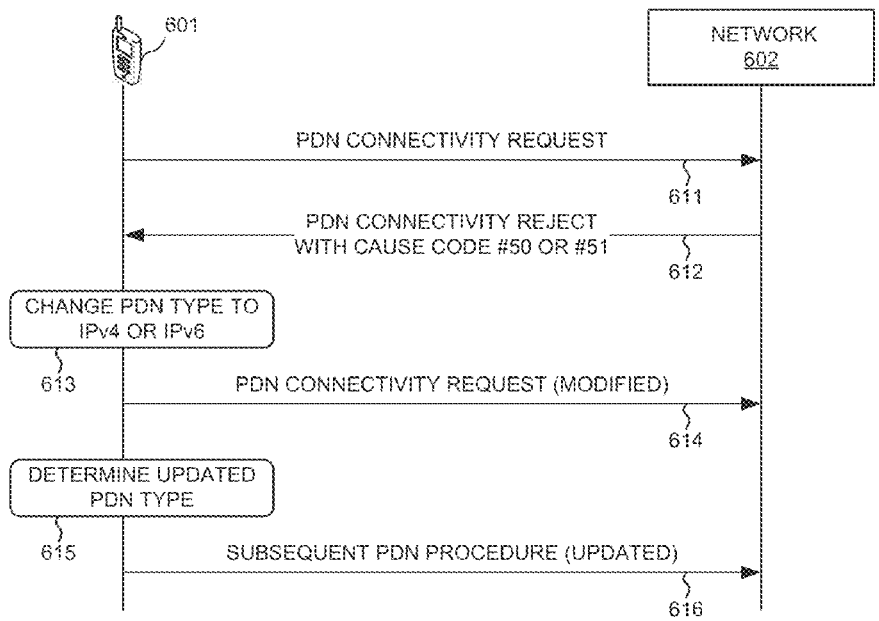
FIG. 6 illustrates a first embodiment for handling PDN connectivity reject with cause code #50 or #51.

FIG. 6 illustrates a first embodiment for handling PDN connectivity reject with cause code #50 or #51. In step 611, UE 601 sends a PDN connectivity request to network 602. In step 612, the network sends a PDN connectivity reject message back to UE 601. The reject message comprises a cause code #50 or #51. The cause code indicates that the PDN connectivity is rejected because "PDN type IPv4 only allowed" (code #50) or "PDN type IPv6 only allowed" (code #51). In step 613, UE 601 checks the cause code and determines an updated the PDN type. For example, if the cause code is #50, then the UE modifies the PDN type to be IPv4. If the cause code is #51, then the UE modifies the PDN type to be IPv6. In step 614, the UE then retries the same PDN procedure under the same APN and PLMN/EPLMN combination. For subsequent PDN procedures to the same APN and PLMN/EPLMN combination, the UE may have different options. In step 615, the UE determines an updated PDN type for the subsequent PDN procedures. In a first option, the UE always applies the previous PDN type (e.g., the PDN type used in step 611). In a second option, the UE always applies the altered PDN type (e.g., the PDN type used in step 614). In a third option, the UE applies the altered PDN type based on a predefined counter of how many times that cause code #50/#51 has been received. The counter may be consecutive or accumulative. For example, if the counter is 3 (three), then the UE applies the previous PDN type initially, and then switches to the altered PDN type if the UE has received cause code #50/#51 for at least three times. In step 616, the UE initiates the subsequent PDN procedures using the updated PDN type determined in step 615.

Figure 7:
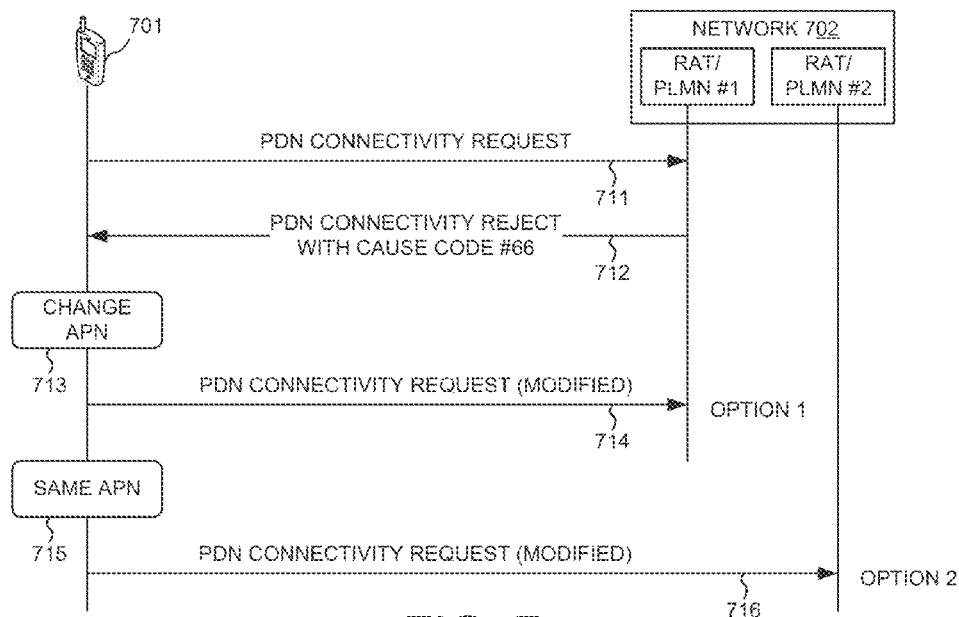
FIG. 7 illustrates a second embodiment for handling PDN connectivity reject with cause code #66.

FIG. 7 illustrates a second embodiment for handling PDN connectivity reject with cause code #66. In step 711, UE 701 sends a PDN connectivity request to network 702. Network 702 comprises two different RAT/PLMN combinations: a first RAT/PLMN combination and a second RAT/PLMN combination. A different RAT/PLMN combination means a different RAT, or a different PLMN/EPLMN, or both are different. In step 711, the PDN connectivity request is sent to RAT/PLMN combination #1. In step 712, the network sends a PDN connectivity reject message back to UE 701. The reject message comprises a cause code #66. The cause code indicates that the PDN connectivity is rejected because "Requested APN not supported in current RAT and PLMN combination" (e.g., RAT/PLMN combination #1). The UE can have two different options to handle such rejection. In a first option, the UE changes the APN to a different APN or to an empty APN (step 713), and then retries the PDN connectivity request with the different or empty APN in the same RAT/PLMN combination #1 (step 714). In a second option, the UE applies the same APN (step 715), and then retries the PDN connectivity request using the same APN in a different RAT/PLMN combination #2 (step 716). Note that UE 701 automatically retries the PDN connectivity without relying on user input.

From the network perspective, improvements can also be made to enhance system performance and user experience. For example, if the PDN connectivity request is for emergency purpose, then the network is capable to grant the request regardless of error cause. This way, permanent rejection can be avoided due to user error and unawareness for time-critical data.

Figure 8:
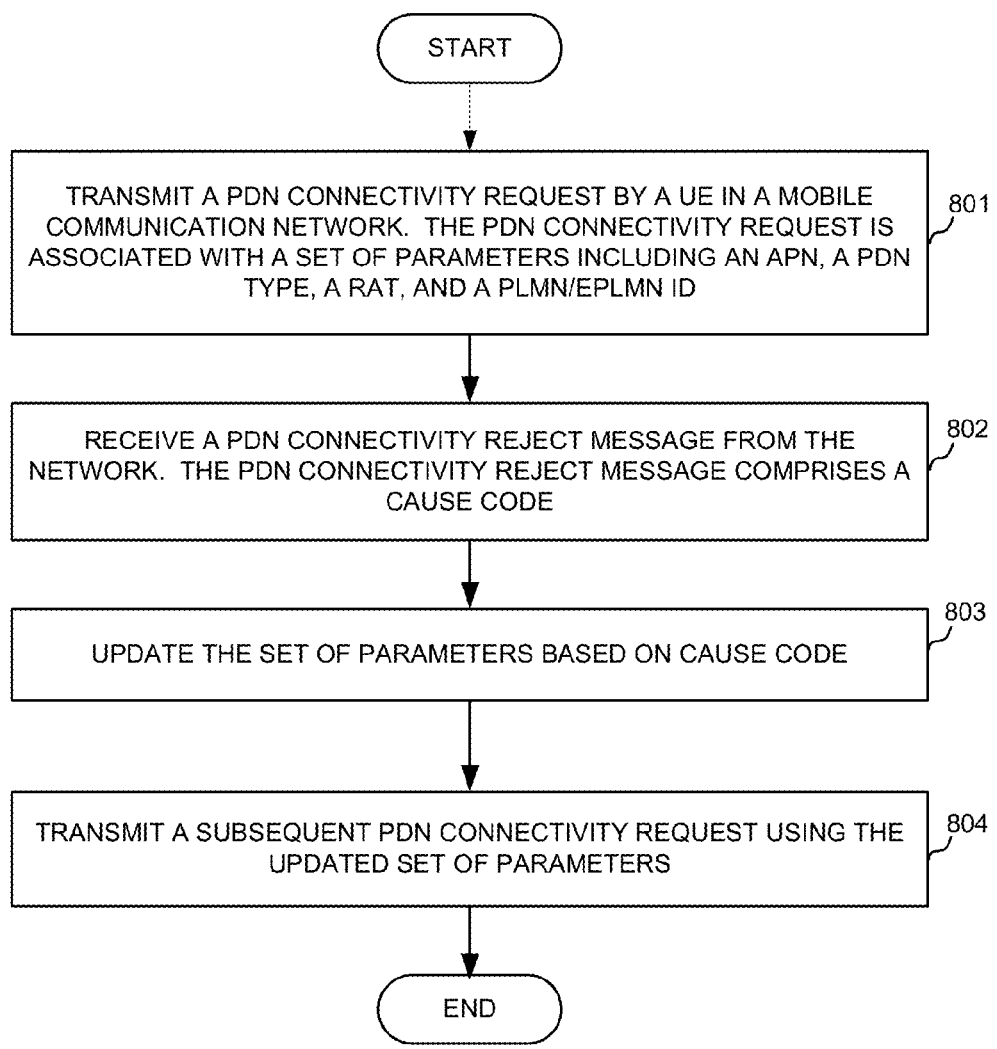
FIG. 8 illustrates an exemplary flow chart for a method of enhanced PDN connectivity procedure in accordance with embodiments of the current invention.

FIG. 8 illustrates an exemplary flow chart for a method of enhanced PDN connectivity procedure in accordance with embodiments of the current invention. In step 801, a user equipment (UE) transmits a packet data network (PDN) connectivity request in a mobile communication network. The PDN connectivity request is associated with a set of parameters including a requested access point name (APN), a PDN type, a radio access technology (RAT), and a PLMN/EPLMN ID. In step 802, the UE receives a PDN connectivity reject message from the network. The PDN connectivity reject message comprises a cause code. In step 803, the UE automatically updates the set of parameters based on the cause code. In step 804, the UE transmits a subsequent PDN connectivity request to the network using the updated set of parameters. In one example, the cause code indicates only PDN type IPv4 is allowed, only PDN type IPv6 is allowed, or the requested APN is not supported in the current RAT/PLMN combination.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
    determining a first Radio Access Technology (RAT) and a first PLMN;
    transmitting a Packet Data Network (PDN) connectivity request for the first RAT and the first PLMN combination by a user equipment (UE) in a mobile communication network, wherein the PDN connectivity request is associated with a set of parameters including a requested Access Point Name (APN), a PDN type;
    receiving a PDN connectivity reject message from the network, wherein the PDN connectivity reject message comprises a cause code;
    updating the set of parameters based on the cause code;
    transmitting a PDN connectivity request using the updated set of parameters to the first RAT and first PLMN combination; and
    transmitting a subsequent PDN connectivity request using the updated set of parameters to the to the same APN when the UE is in a second RAT and the first PLMN combination or the second RAT and a second PLMN combination, wherein the second PLMN is an equivalent PLMN of the first PLMN.

2. The method of claim 1, wherein the UE is prohibited from transmitting another PDN connectivity request for the same APN and PLMN/EPLMN combination.

3. The method of claim 1, wherein the UE automatically updates the set of parameters and transmits the subsequent PDN connectivity request.

4. The method of claim 1, wherein the cause code indicates that only PDN type IPv4 is allowed, or indicates only PDN type IPv6 is allowed.

5. The method of claim 4, wherein the UE updates the PDN type and transmits the subsequent PDN connectivity request under the same APN and PLMN/EPLMN combination.

6. The method of claim 4, wherein the UE applies an original PDN type or an updated PDN type for all subsequent PDN procedures.

7. The method of claim 4, wherein the UE, for subsequent PDN connectivity request to the same APN and PLNM/EPLMN combination, applies an original PDN type for a predefined number of times with a PDN rejection response and the cause code indicating that only PDN type IPv4 is allowed, or only PDN type IPv6 is allowed.

8. The method of claim 1, wherein the cause code indicates that the requested APN is not supported in the current RAT and PLMN combination.

9. The method of claim 8, wherein the UE updates the APN and transmits the subsequent PDN connectivity request in the same RAT and PLMN/EPLMN combination.

10. The method of claim 8, wherein the UE uses the same APN and transmits the subsequent PDN connectivity request in a different RAT and PLMN/EPLMN combination.

11. A user equipment (UE), comprising:
    a transmitter that transmits a Packet Data Network (PDN) connectivity request for a first PLMN and a first Radio Access Technology (RAT) combination in a mobile communication network, wherein the PDN connectivity request is associated with a set of parameters including a requested Access Point Name (APN), a PDN type, a RAT, and a first PLMN ID;
    a receiver that receives a PDN connectivity reject message from the network, wherein the PDN connectivity reject message comprises a cause code; and
    a PDN connectivity handler that updates the set of parameters based on the cause code, transmits a PDN connectivity request using the updated set of parameters to the first RAT and first PLMN combination, and transmits a subsequent PDN connectivity request using the updated set of parameters to the same APN when the UE is in a second RAT and the first PLMN combination or the second RAT and a second PLMN combination, wherein the second PLMN is an equivalent PLMN of the first PLMN.

12. The UE of claim 11, wherein the UE is prohibited from transmitting another PDN connectivity request for the same APN and PLMN/EPLMN combination.

13. The UE of claim 11, wherein the UE automatically updates the set of parameters and transmits the subsequent PDN connectivity request.

14. The UE of claim 11, wherein the cause code indicates that only PDN type IPv4 is allowed, or indicates only PDN type IPv6 is allowed.

15. The UE of claim 14, wherein the UE updates the PDN type and transmits the subsequent PDN connectivity request under the same APN and PLMN/EPLMN combination.

16. The UE of claim 14, wherein the UE applies an original PDN type or an updated PDN type for all subsequent PDN procedures.

17. The UE of claim 14, wherein the UE, for subsequent PDN connectivity request to the same APN and PLNM combination, applies an original PDN type for a predefined number of times with a PDN rejection response and the cause code indicating that only PDN type IPv4 is allowed, or only PDN type IPv6 is allowed.

18. The UE of claim 11, wherein the cause code indicates that the requested APN is not supported in current RAT and PLMN combination.

19. The UE of claim 18, wherein the UE updates the APN and transmits the subsequent PDN connectivity request in the same RAT and PLMN/EPLMN combination.

20. The UE of claim 18, wherein the UE uses the same APN and transmits the subsequent PDN connectivity request in a different RAT and PLMN/ELPMN combination.

* * * * *